United States Patent [19]

Stucke

[11] Patent Number: 4,510,007
[45] Date of Patent: Apr. 9, 1985

[54] METHOD OF JACKETING STEEL PIPES

[75] Inventor: Walter Stucke, Ratingen, Fed. Rep. of Germany

[73] Assignee: Mannesmann AG, Dusseldorf, Fed. Rep. of Germany

[21] Appl. No.: 511,200

[22] Filed: Jul. 6, 1983

[30] Foreign Application Priority Data

Jul. 6, 1982 [DE] Fed. Rep. of Germany ....... 3225646
Dec. 20, 1982 [DE] Fed. Rep. of Germany ....... 3247510

[51] Int. Cl.³ .............................................. B29D 23/04
[52] U.S. Cl. .......................... 156/244.12; 156/244.13; 156/244.23; 156/244.24; 156/272.2; 264/173; 264/209.1; 264/271.1; 264/279.1; 427/195
[58] Field of Search ...................... 156/244.12, 244.13, 156/244.23, 244.24, 272.2; 264/173, 209.1, 209.6, 271.1, 272.13, 279.1; 427/195; 425/113, 114

[56] References Cited

U.S. PATENT DOCUMENTS

4,060,655 11/1977 Johannes et al. .................... 427/195
4,211,595 7/1980 Samour .......................... 156/244.13
4,213,486 7/1980 Samour .............................. 427/195

*Primary Examiner*—Caleb Weston
*Attorney, Agent, or Firm*—Ralf H. Siegemund

[57] ABSTRACT

The disclosed method is particularly applicable for jacketing pipes of a diameter of between 50 mm and 500 mm and is provided for high jacketing speeds and high throughputs. The pipe is heated initially to a temperature at least sufficient to cause a subsequently applied epoxy resin-curing agent powder blend to melt; a coherent and uniform epoxy coating is desired which may require subsequent heating of the epoxy coating. The epoxy coating will cure at a temperature from 145 degrees Centigrade to 155 degrees Centigrade within 50 to 70 minutes and the layer thickness should be between 30 and 50 micrometers. Prior to applying the jacket, the thermally produced reaction products must escape; this is ensured by an infrared radiation step which raises the temperature to about 200 degrees Centigrade. In the case of a thermo-sensitive interior of the steel pipe, this heating step provides not only for the evaporation of reaction products, but it is the same step which makes sure that the preheated and slightly melted powder obtains sufficient fluidity.

9 Claims, No Drawings

METHOD OF JACKETING STEEL PIPES

BACKGROUND OF THE INVENTION

The present invention relates to the jacketing of metallic shapes and sections such as steel pipes by means of thermoplastic material, particularly polyethylene.

German printed patent application No. 12 61 431 discloses the coating of metal surfaces by means of a polyethylene jacket in that initially a blend of an epoxy resin and of a hardening and curing agent is deposited upon the metal surface and curing is permitted to begin, whereafter, by means of a flame-spray gun, some polyethylene is sprayed upon the coated metal surface, and after curing of the epoxy resin layer has been completed, additional polyethylene is sprayed upon, whereby the temperature of the metal surface is not to exceed 100-degree centigrade. In accordance with the particular example set forth in that publication, curing of the epoxy resin layer occurs at a temperature not exceeding 60 degrees Centigrade and for about 24 hours. For mass production of jacketed steel pipes, this method is uneconomical because a large throughput is incompatible with such a long curing period for the epoxy layer.

In accordance with the German printed patent No. 19 65 802, the jacketing of steel pipes by means of polyethylene has been proposed, in which the pipes, at first, are heated to a working temperature above 100 degrees Centigrade, whereupon a base layer is coated upon the heated tube which will crosslink at that temperature; the layer is preferably an epoxy resin. Subsequently to the curing of the epoxy resin and particularly immediately after the completion of the curing process, a thin ribbon of ethylene copolymer material is extruded and wrapped around the epoxy resin coated tube and a polyethylene ribbon is also extruded and wrapped around the ethylene copolymer ribbon, the latter serving as an adhesive for the polyethylene ribbon. The throughput and operational speed of this procedure is limited because a certain period of time is needed to permit evaporation and volitalization of the reaction products of the curing and crosslinking processes of the epoxy layer. The method, moreover, is therefore limited to the utilization of coating and jacketing tubes having a diameter in excess of 600 mm.

In accordance with the German Pat. No. 22 22 911, it is known to provide the following procedure. A steel pipe, having a temperature in the range of 70 degrees to 90 degrees Centigrade and having been coated in its interior with a heat-sensitive layer, is provided with a base layer made of a curable expoxy resin blend, upon which a coating is extruded as a kind of twin-hose consisting of an ethylene copolymer and an outer polyethylene layer. After the jacketing has been completed, the tubes are cooled at room temperature at a dwell time of about 3 minutes. Complete curing requires a longer time and, in fact, curing has been completed at room temperature and 65% ambiant air humidity only after an elapse of about 24 hours. This relatively long period of completion of the curing process is again detrimental to the overall throughput. Moreover, the initial process parameters have to be maintained very carefully. In the case of deviation, further delay of the curing is incurred or a completion of curing may be prevented entirely.

In order to improve the aforementioned method, the German Pat. No. 22 57 135 proposes to increase the surface temperature of the steel pipe to be jacketed to a temperature of about 80 degrees Centigrade and to provide an electrostatic coating by means of a solution-containing epoxy resin and a curing agent blend, the layer thickness is about a 100 micrometers. This layer serves as a base upon which the thermoplastic jacket is provided. This thermoplastic layer may consist of an inner ethylene copolymer and an outer polyethylene layer. The thus jacketed tubes or pipes are then cooled in water to a mean temperature of the tube of about 40 degrees Centigrade. Subsequently, the core tube is inductively heated to a mean temperature of about 100 degrees Centigrade. The surface temperature of the tube will, in fact, rise to about 240 degrees Centigrade. At this temperature, curing of the epoxy resin base layer occurs within a few seconds. Subsequently, the jacketed tube is cooled back to room temperature.

It has been found, however, that in many cases of practicing this last-mentioned method, the depositing of a twin-hose coating by means of extrusion upon tubes or pipes which are between 6 meters or 12 meters long, difficulties occur in that the evaporation of the solvent from the epoxy-resin curing agent blend is insufficient for a pipe speed of, say, 20 meters per minute, as envisioned in this method. This is compounded by the desired layer thickness and the existing temperature of the tube prior to depositing the twin-tube. On the other hand, a method of jacketing a tube having a diameter larger than 600 meters by means of a strip-shaped twin-foil is quite suitable.

DESCRIPTION OF THE INVENTION

It is an object of the present invention to provide a new and improved method for jacketing a steel pipe by means of a twin-hose in such a manner that a high jacketing speed can be obtained for purposes of increasing the throughput of pipes or tubes, for example, within the range of 50 mm to 500 mm.

It is a particular object of the present invention to provide a new and improved method for jacketing elongated metal sections such as steel pipes by means of a thermoplastic, particularly polyethylene, layer, wherein a base is provided first, consisting of a blend of an epoxy resin and a curing agent, upon which an ethylene copolymer is provided to serve as an adhesive, and a thermoplastic layer, such as polyethylene, is provided on top of the adhesive, whereby particularly the adhesive and the thermoplastic layer are to be applied as a twin- or two-ply hose.

In accordance with the preferred embodiment of the present invention, the objects, and here particularly the particular object, of the invention are obtained by proceeding in the following manner. Initially, a particular blend is provided consisting of a powdery precondensated blend of an epoxy resin and a curing agent*, such as it will cure at a temperature between 145 degrees Centigrade and 155 degrees Centigrade within 50 minutes to 70 minute. This blend is applied directly to the object to be jacketed, such as a steel pipe, at a layer thickness between 30 to 50 micrometers after the coated object has been heated to a temperature of at least 80 degrees Centigrade. In order to homogenize the melted layer and to cause evaporation of the reaction products without curing, the layer is heated from the outside to a temperature of about 200 degrees Centigrade by means of passing the coated object, i.e., the coated pipe, along a source of heat for applying thermoenergy from the outside; this base layer or coating is heated accordingly. Subsequently, a twin-foil of hose-like tubular configuration is extruded upon the precoated object under the proviso that the ethylene copolymer portion of the twin- or double-ply hose has been predried, and under the further assumption that the extrusion temperature particularly of the outer thermoplastic hose amounts to about 165 degrees Centigrade to 190 degrees Centigrade, whereby the twin-hose has a relative layer volume which is at least the 36-fold of the volume of the initial precoating. Curing of the base coating is obtained under the condition, in which the thermoplastic layer is limited so to its surface temperature for about an hour to about 50 degrees to 60 degrees Centigrade and, thereafter, the thermoplastic layer is permitted to cool to room temperature.

*As curing agent for example amines can be used.

The invention is particularly applicable and practicable in those cases in which the tube or pipe to be coated has a heat-sensitive interior layer of a synthetic material bituminous subject, a mortar which includes cement or the like, whereby prior to providing the base layer the tube is heated to a temperature which does not exceed 100 degrees Centigrade. The temperature should be about 80 degrees Centigrade, but immediately prior to applying the base coating to the surface, its temperature is raised by about 20 degrees to 30 degrees Centigrade by means of infrared radiation. In the alternative and particularly in those cases in which the tube or pipe does not contain a heat-sensitive interior layer, the tube or pipe may be heated initially, i.e., prior to providing the base layer, to a temperature of at least 150 degrees Centigrade; for example, 170 degrees Centigrade and immediately prior to applying the base layer, the surface temperature is raised by 20 degrees to 30 degrees Centigrade through infrared radiation.

Generally speaking, the epoxy resin-curing agent layer blend after having been applied is heated by means of infrared radiation, so that the reaction products can escape. The twin hose is applied (extruded) thereafter. In accordance with another feature of the invention, the ethylene copolymer of the twin-hose is predried prior to application for about 1½ hours at a temperature of 70 degrees Centigrade.

It can be seen from the foregoing that the epoxy resin-curing agent blend is applied upon a thermally prepared pipe, having an overall and average temperature below 200 degrees Centigrade. The surface temperature, however, should be at least as high as is necessary to permit at least some initial melting of the epoxy-curing agent blend. That temperature does not have to be 200 degrees Centigrade and, in the case of a temperature-sensitive interior layer, the surface temperature of the pipe needs to be not much more than about 100 degrees Centigrade. If these constraints do not exist, then initial or supplemental heating prior to applying the epoxy blend may come close to or even reach 200 degrees Centigrade.

If the pipe was not permitted to be heated to such a high temperature, and if the surface temperature was not much more than 100 degrees Centigrade as the epoxy powder is applied, then little melting occurs and the subsequent heating step, such as an infrared heating step, using radiation which does not impinge directly upon the steel pipe but upon the epoxy material, will cause it now to attain sufficient fluidity for forming a coherent layer. This heating should be a brief one so that the total amount of heat influx is insufficient to raise the temperature in the pipe above permissible limits.

The rules expounded above include ranges for operating process parameters, particularly with regard to the volume relations of the layer involved, and here particularly with regard to the volume ratios concerning the epoxy resin base coating and the thermoplastic layer. These rules have the particular advantage that the heat needed for curing the particular epoxy resin is extracted from the considerably thicker synthetic jacket of the hose which is initially at least 150 degrees Centigrade warm, preferably warmer than 165 degrees Centigrade. Therefore, an additional heat treatment of the jacketed tube for purposes of obtaining and completing curing is no longer necessary. The curing process is rendered independent from the ambiant temperature and the relative humidity.

The invention will be explained in greater detail with reference to a particular example. The first example to be considered includes a steel pipe which does not contain a heat-sensitive interior layer. The steel pipe is presumed to be 6 meters long and has an outer diameter of 150 millimeters. This tube is inductively heated to about 170 degrees Centigrade, for which purpose the tube is passed through an induction coil at a speed of about 20 meters per minute. Following this inductive heating, the surface of the tube is further heated by irradiation with infrared, whereby particularly the tube is passed through an infrared radiator at the same speed of 20 meters per minute to, thereby, raise the surface temperature to about 200 degrees Centigrade. Immediately thereafter, a powdery, precondensated epoxy resin-curing agent blend is applied electrostatically to obtain a coating at a thickness of only 30 micrometers to 50 micrometers. As the powder is applied, the epoxy resin-curing agent blend melts as it hits the surface of the tube. The hot pipe imparts sufficient fluidity upon the melting powder and a coherent layer will result.

It can readily be seen that this immediate melting is somewhat retarded if the tube or pipe was previously provided with a temperature-sensitive interior coating so that it could be heated initially only to a temperature of about 80 degrees Centigrade, with infrared heating raising the surface temperature to only about 110 degrees Centigrade. In such a case, the epoxy resin-curing agent powder will melt, but will not form a coagulating and coherent film or coating, but will remain in individual drops of limited fluidity.

Following the electrostatic application of the epoxy, the layer or coating, even if it has not completely melted, is heated to a temperature of about 200 degrees Centigrade by means of infrared radiation. This is carried out and obtained by passing the tube at still the same speed of 20 meters per minute through a second annularly shaped, infrared radiation equipment. This, then, will result in a coherent layer.

It can thus be seen that a coherent thin epoxy resin-curing agent layer is formed in any event by means of electrostatically applying powder of the requisite consistency. If the conditions permitted that the pipe or tube to which the epoxy powder is applied can be heated to a sufficiently high temperature, such as a 170 degrees Centigrade, so that the particular powder material will not only melt but will obtain sufficient fluidity in order to form a thin but coherent layer. Thus, subsequent heating does not affect much the configuration of the epoxy coating. If for reasons of an interior layer or for other reasons it is not permitted to preheat the pipe or tube to such a high temperature, i.e., if the applied powder particles will just barely melt but not sufficiently flow, the subsequent heating by means of infrared radiation will raise the temperature of the melted powder to a sufficient degree of fluidity without penetrating deep into the steel material to affect a temperature-sensitive layer on the inside of the tube. In either case, one will obtain a thin, coherent, curable epoxy resin layer.

The supplemental infrared heating of the epoxy coating is required, even if the coating is already coherent, because reaction products must be released rapidly from the epoxy resin layer, within about 10 seconds without completion of curing. After this procedure, and particularly upon exiting of the tube or pipe from the second infrared radiator, the layer is free from certain reaction products but has not yet cured completely. Nevertheless, a thermoplastic twin-hose is now applied with an outer, relatively thick layer of polyethylene and an interior layer of an ethylene copolymer having adhesive properties, which twin- or two-ply hose is applied to the tube surface by means of extrusion. At that point, the temperature of the hose is between 165 degrees Centigrade and 190 degrees Centigrade and, based primarily on the polyethylene layer, the relative layer volume of the hose as applied is the 40-fold value as the volume of epoxy resin coating. In view of the close similarity of the diameters involved, this amounts to approximately a layer thickness ratio of 40 to 1.

The thus jacketed tube, and here particularly the thermoplastic layer thereof, is cooled subsequently for one hour so that the outer surface temperature drops to and remains at 50 to 60 degrees Centigrade during that period; one will use here an open waterbath. After this particular cooling process, the jacketed pipe is permitted to cool in ambiant air, whereby initially the steel tube itself has a temperature from about 70 to 90 degrees Centigrade. During this entire cooling process, the epoxy base coating will cure completely.

In the following, data will be presented which permit proper evaluation of the improvement that results from the application of the inventive method. The peel strength in Newton's per centimeter at 20 degrees Centigrade of a tube jacketed in accordance with the present invention amounts to about 90 to 120 which favorably compares with the peel strength of 35 N/cm of a similar twin-hose without epoxy base coating. The peel strength in Newton's per centimeter in accordance with the so-called "Koch test" at 65 degress Centigrade after 30 days, the test applied at 20 degrees Centigrade, was 45 to 60 in the above-mentioned example, while without base coating under the same conditions, the peel strength amounted to about 0 to 20. The disbonding characteristics under ASTM conditions in millimeters were from 0 to 5 for the tube or pipe jacketed in accordance with the inventive method while prior art procedure without epoxy base coating exhibited 8 to 30 millimeters disbonding.

It is believed that the invention is particularly advantageously applicable to the coating of tubes which do have an interior layer of a sensitive material. This is the case, for example, for tubes which are provided in the interior with a corrosion-proofing material such as a particular epoxy resin lacquer, a bituminous layer, an alloyed cement mortar, or the like. It is imperative that the corrosion-proofing interior layer of such a tube is not damaged. Therefore, further procedure is limited to a temperature of about 100 degrees Centigrade, at least in the immediae vicinity of this protective interior layer. In the example above, it was mentioned that this requires the inventive method to be applied in two-stage process, at first the tube is run through an inductive coil to heat it to about 80 degrees Centigrade, which is a temperature that the tube may receive through its entirety. Next, an infrared radiator will heat the outer surface to about 110 degrees Centigrade. This heating process is applied immediately prior to applying the epoxy base coating which, as was mentioned above, is preferably applied electrostatically in a powdery consistency. Subsequently to coating, the barely melted powder layer is caused to form a coherent thin layer in that infrared radiation is applied additionally and again just to the surface.

It can readily be seen that the two-stage surface heating is used to provide initially conditions which are just sufficient for causing the powder to melt; and in the second stage, the melted powder by and in itself is caused to flow so to form a coherent layer. This way, penetrating heat and application of large quantities of thermoenergy to the pipe as a whole is avoided. One heats only that part which has to be heated in order to obtain immediately and directly the requisite functions; any excess heating is readily avoided so that, from an overall point of view, the average tube temperature does not exceed any critical value; and specifically, as far as this detail is concerned, the applied amount of heat, which will ultimately, of course, migrate to some extent in the interior of the tube, will not raise the temperature of the interior coating to a dangerous level. Moreover, it was pointed out that following the coating and heating and jacketing process cooling is applied and that, of course, means that a temperature gradiant is set up so that the initially applied thermoenergy does not have to migrate into the interior, but can also escape through the outer surface and into the cooling medium which, as stated, is water and provides a more readily amenable acceptor for thermoenergy than air in the interior of the tube so that, in fact, the outflow of heat from the tube as a whole will be favored in outer direction rather than toward the interior. Moreover, the two-step procedure as applied and to be effective primarily in the respective surface regions only, makes sure that the overall amount of thermoenergy as applied is very limited.

The invention is not limited to the embodiments described above; but all changes and modifications thereof, not constituting departures from spirit and scope of the invention, are intended to be included.

I claim:

1. Method of jacketing an elongated cylindrical metallic object, comprising the steps of:

heating the object to a temperature of at least 80° Centigrade;

applying a powdery precondensated blend of an epoxy resin and a curing agent to said object, said blend having properties of curing within 50 to 70 minutes at a temperature of 145° to 155° Centigrade, the amount of blend so applied being sufficient to obtain a base layer thickness of 30 to 50 micrometers;

raising the temperature of the epoxy base layer from the outside to about 200° Centigrade by passing the object through a source of thermoenergy to evaporate reaction products from a melted and coherent epoxy coating;

extruding a double hose upon the hot base layer at an extrusion temperature between 165° Centigrade and 190° Centigrade, the double hose having two layers accordingly wherein the inner one of the two layers includes an adhesive of ethylene copolymer, the outer layer of the two-ply hose being a thermoplastic synthetic material, having a thickness so that the ratio of the relative volume of applied hose material to the relative volume of the base is at least 36 to 1;

subsequently curing the base layer by applying the thermoplastically coated object to a cooling medium for about an hour under conditions which limit the temperature of the thermoplastic layer to a temperature of 50° Centigrade to 60° Centigrade; and subsequently permitting the object with jacket to cool to room temperature.

2. Method as in claim 1, being preceded by applying a temperature-sensitive interior layer upon the object being of hollow configuration, the material of the object adjacent to the temperature-sensitive coating should remain at a temperature not exceeding about 100 degrees Centigrade.

3. Method as in claim 2, wherein said heating of said object is limited so that the temperature of the object as a whole is about 80° Centigrade; raising the surface temperature of the object by means of infrared radiation by about 20° to 30° Centigrade immediately prior to said powder-applying step, said heating step for obtaining 200° surface temperature being applied only to the epoxy resin-curing agent blend after it has been applied to the object following the said heating of the surface of the object to 110° Centigrade pursuant to the preceding heating steps.

4. Method as in claim 1, wherein said object prior to said powder-applying step is heated to a temperature of at least 150 degrees Centigrade.

5. Method as in claim 1, wherein said object prior to applying the powder is heated to a temperature of about 170° Centigrade following which the surface temperature is raised by 20 to 30 degrees Centigrade immediately prior to said powder-applying step so that the powder as applied melts and forms a coherent layer due to sufficient fluidity obtained by transfer of heat from the object immediately prior to the powder-applying step, by means of said infrared heating step.

6. Method as in claim 1, wherein, pursuant to said raising step, said epoxy resin-curing agent blend is heated by infrared radiation subsequent to application of the epoxy powder to said object.

7. Method as in claim 1, wherein said ethylene copolymer prior to application as inner layer of the double hose is predried at about 70 degrees Centigrade for about 1½ hours.

8. Method of jacketing steel pipes comprising the steps of:

heating the pipe to a temperature in excess of 150 degrees Centigrade;

heating the surface of the pipe by means of infrared radiation to about 200 degrees Centigrade;

applying a powdery precondensated epoxy resin-curing agent blend to said heated pipe surface, the blend curing at a temperature of 145 degrees Centigrade to 155 degrees Centigrades within 50 to 70 minutes, the amount applied being sufficient to obtain a coherent coating layer having a thickness between 30 and 50 micrometers;

infrared heating the coating to 200 degrees Centigrade to cause evaporation of reaction products;

applying an extruded two-ply hose to said coated pipe, the inner layer of the two-ply hose being an adhesive comprised of an ethylene copolymer, the outer layer being a thermoplastic at a thickness so that the volume of the layer material in relation to the volume of the initial coating is in excess of 36 to 1;

curing the initial layer by applying heat through the outer surface of the applied hose and limiting its temperature to about 50 to 60 degress Centigrade for about an hour; and permitting subsequently the pipe to cool to room temperature.

9. Method of jacketing a steel pipe carrying on its interior a temperature-sensitive layer whose temperature should not exceed about 100 degrees Centigrade, comprising the steps of:

heating the pipe to a temperature of about 80 degrees Centigrade;

raising the surface temperature of the heated pipe by means of infrared radiation by additional 20 to 30 degrees Centigrade;

applying to the thus heated pipe a powdery precondensated epoxy resin-curing agent blend to the heated pipe at an amount sufficient for obtaining a coating having a thickness of about 30 to 50 micrometers, the blend curing at a 145 degrees Centigrade to 155 degrees Centigrade within 50 to 70 minutes;

heating the coated pipe by means of infrared radiation so that the coating obtains a temperature of about 200 degrees Centigrade so that the melted coating material has sufficient fluidity and forms a coherent layer;

extruding a two-ply hose upon said coated pipe at an extrusion temperature of about 165 degrees Centigrade to 190 degrees Centigrade, the inner layer of the two-ply hose being an ethylene copolymerizate adhesive, the outer layer being a thermoplastic at a volume so that the ratio of layer volume of the thermoplastic layer to epoxy resin coating is in excess of 36 to 1;

curing the coating by applying heat to the thermoplastic coating from the outside for about an hour while limiting the outer surface temperature of the thermoplastic layer to about 50 to 60 degress Centigrade; and permitting the jacketed tube to cool to room temperature.

* * * * *